United States Patent
Dudkowiak et al.

(10) Patent No.: US 9,233,576 B2
(45) Date of Patent: Jan. 12, 2016

(54) WHEEL HUB ROTARY JOINT ARRANGEMENT

(71) Applicant: Bayerische Motoren Werke Aktiengesellschaft, Munich (DE)

(72) Inventors: Johann Dudkowiak, Poecking (DE); Eduard Ginglas, Horgau-Auerbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/505,726

(22) Filed: Oct. 3, 2014

(65) Prior Publication Data

US 2015/0021973 A1  Jan. 22, 2015

Related U.S. Application Data

(63) Continuation of application No. PCT/EP2013/054145, filed on Mar. 1, 2013.

(30) Foreign Application Priority Data

Apr. 5, 2012 (DE) .................. 10 2012 205 727

(51) Int. Cl.
*F16D 1/076* (2006.01)
*B60B 27/00* (2006.01)
*F16D 3/18* (2006.01)

(52) U.S. Cl.
CPC ......... *B60B 27/0036* (2013.01); *B60B 27/0031* (2013.01); *B60B 27/0042* (2013.01);
(Continued)

(58) Field of Classification Search
CPC ............ B60B 27/0031; B60B 27/0036; B60B 27/0042; B60B 2310/224; B60B 27/3142; B60B 2900/325; F16D 1/072; F16D 1/076
USPC ....................................... 464/178
See application file for complete search history.

(56) References Cited

U.S. PATENT DOCUMENTS

| 4,460,058 | A | * | 7/1984 | Welschof et al. ............. 464/906 |
| 5,052,979 | A |   | 10/1991 | Welschof et al. |
| 8,002,640 | B2 |  | 8/2011 | Cermak et al. |
| 8,025,578 | B2 |  | 9/2011 | Cermak |

(Continued)

FOREIGN PATENT DOCUMENTS

| DE | 31 16 720 C1 | 10/1982 |
| DE | 34 30 067 C2 | 4/1986 |

(Continued)

OTHER PUBLICATIONS

Translation of DE 10 2008 029 253. Wheel bearing unit for vehicle i.e. heavy passenger car, has synchronization rotary joints and two rows of rolling bodies, where ratio of distance between rolling bodies to teeth outer diameter of front teeth is in specific range. Langer, et al. Dec. 24, 2009.*

(Continued)

*Primary Examiner* — Josh Skroupa
(74) *Attorney, Agent, or Firm* — Crowell & Moring LLP

(57) ABSTRACT

A wheel hub rotary joint assembly includes a wheel hub with a wheel flange and a sleeve section for receiving a wheel bearing; and a constant-velocity rotary joint with an outer joint part having a first spur gearing section with first teeth at its end facing the wheel hub. The sleeve section has a second spur gearing section with second teeth at its end facing the rotary joint. The two spur gearing sections engage one another for torque transmission. At least one of the two spur gearing sections is designed such that, viewed in the radial direction, the first and second teeth initially only come into contact with one another on a small subsurface of the tooth surfaces facing one another during axial tensioning. Viewed in the radial direction, the first and second teeth initially come only into contact with one another on the radially inward side and, as tensioning increases, also come into contact with one another on the radially outward side, for which purpose a substructure of the sleeve section and/or of the outer joint part having the teeth is more easily deformable in a radially inward region than in a region lying radially further outward.

10 Claims, 2 Drawing Sheets

(52) U.S. Cl.
CPC ............ *B60B27/0084* (2013.01); *F16D 1/076* (2013.01); *F16D 3/18* (2013.01); *B60B 27/0005* (2013.01); *B60B 2310/224* (2013.01); *B60B 2310/3025* (2013.01); *B60B 2310/3142* (2013.01); *B60B 2900/325* (2013.01); *B60Y 2200/11* (2013.01)

(56) References Cited

U.S. PATENT DOCUMENTS

| | | | |
|---|---|---|---|
| 8,025,579 B2 * | 9/2011 | Kamikawa et al. | 464/178 |
| 8,100,775 B2 * | 1/2012 | Hirai et al. | 464/178 |
| 8,256,967 B2 * | 9/2012 | Langer et al. | 384/544 |
| 2014/0216125 A1 | 8/2014 | Langer et al. | |

FOREIGN PATENT DOCUMENTS

| | | |
|---|---|---|
| DE | 10 2005 018 127 A1 | 10/2006 |
| DE | 10 2005 054 285 B3 | 5/2007 |
| DE | 10 2006 030 478 A1 | 1/2008 |
| DE | 10 2005 054 283 B4 | 7/2009 |
| DE | 10 2008 029 253 A1 | 12/2009 |
| EP | 2 045 100 A2 | 4/2009 |

OTHER PUBLICATIONS

International Search Report dated Jun. 24, 2013 (Three (3) pages).
German Search Report dated Dec. 6, 2012, with partial English translation (Ten (10) pages).

* cited by examiner

WHEEL HUB ROTARY JOINT ARRANGEMENT

CROSS REFERENCE TO RELATED APPLICATIONS

This application is a continuation of PCT International Application No. PCT/EP2013/054145, filed Mar. 1, 2013, which claims priority under 35 U.S.C. §119 from German Patent Application No. 10 2012 205 727.7, filed Apr. 5, 2012, the entire disclosures of which are herein expressly incorporated by reference.

BACKGROUND AND SUMMARY OF THE INVENTION

The present invention relates to a wheel hub rotary joint arrangement with an axis of rotation, including (a) a wheel hub with a wheel flange for connecting a wheel, and with a sleeve section for receiving a wheel bearing; (b) a constant-velocity rotary joint with an outer joint part, an inner joint part and torque-transmitting elements, wherein the outer joint part has a first spur gearing section with first teeth at its end facing the wheel hub, and the sleeve section has a second spur gearing section with second teeth at its end facing the constant-velocity rotary joint, and wherein the two spur gearing sections engage with one another for torque transmission; and (c) clamping devices for axially clamping the wheel hub against the outer joint part, said clamping devices being axially supported on one side on the wheel hub and on the other side on the outer joint part. In regard to the above, reference can be made directly to DE 10 2005 054 283 B4 and DE 31 16 720 C1. Furthermore, with regard to the prior art, reference is made to DE 34 30 067 C2 and DE 10 2005 054 285 B4.

In the two documents mentioned first above, a principally advantageous connection between, in general, a wheel hub unit and an associated drive shaft for a motor vehicle is described. The prior art that has been the common practice up to now for this purpose is the use of a so-called splined journal connection as it is described, for example, in the aforementioned DE 34 30 067 C2. Compared with this, assembling the drive shaft to the wheel hub unit can be significantly simplified if a spur gearing section is provided between these two components, as shown for the first time in the above-mentioned DE 31 16 720 C1. In DE 31 16 720 C1, it is also already proposed that the drive shaft's end face facing the wheel hub is curved in a plate-shaped manner, wherein the end face of the drive shaft is formed by a joint body which is designated herein as an outer joint part of a constant-velocity joint and on which said spur gearing section is attached. At the same time, DE 31 16 720 C1 describes already that the counterface of the wheel hub on which the spur gearing section complementary to the spur gear section of the drive shaft is attached, is formed such that during assembly, the spur gearing section first engages on the outer diameter and only thereafter it engages on the entire surface due to elastic deformation on the end face of the outer joint body caused by the pretensioning of a pin which, in the present invention, is designated as clamping devices for axially clamping the wheel hub against the outer joint part.

Furthermore, in DE 10 2005 054 283 B4, the facts just explained are described again with slightly different wording. For the description of the present invention, reference is made expressly to DE 10 2005 054 283 B4, also by using herein the same terms for the same components. Since DE 10 2005 054 283 B4 can be used for the fundamental description of a wheel hub rotary joint arrangement according to the invention, individual components thereof are not described in detail hereafter; rather, the content of said DE 10 2005 054 283 B4 (having U.S. counterpart U.S. Pat. No. 8,025,578 B2) is hereby incorporated by reference. FIG. 3 of the present application is a simplified version of FIG. 1 from U.S. Pat. No. 8,025,578 B2. FIG. 3 shows a wheel hub rotary joint assembly having a wheel hub 11 with a wheel flange 15 for connecting a wheel and with a sleeve portion 14 for receiving a wheel bearing 13. A constant-velocity rotary joint 12 has an outer joint part 22, an inner joint part 23 and torque transmitting elements 26. The outer joint part 22, at its end facing the wheel hub 11, includes a first face toothing 38 with first teeth. The sleeve portion 14, at its end facing the constant-velocity rotary joint 12, includes a second face toothing 39 with second teeth. The two sets of face toothings 38, 39 engage one another for torque transmitting purposes. A clamp 17 axially clamps the wheel hub 11 to the outer joint part 22. The wheel bearing 13 has an axial length $B_L$, and the spur gearing section has a mean diameter $D_M$.

Thus, in the first instance, only the differences between DE 10 2005 054 283 B4 and the present invention are discussed in the following. These differences result from the object underlying the present invention, namely to provide a measure by which a disadvantageous aspect occurring in the case of a wheel hub rotary joint arrangement according to the prior art, known from DE 31 16 720 C1 and DE 10 2005 054 283 B4, can be prevented. It has in fact become apparent that with an appropriate design of the outer joint part and/or the sleeve section of the wheel hub it is not possible, on the one hand, to design the components in such a manner that they are sufficiently solid and stiff in order to be able to actually absorb and transmit the high torques to be transmitted and, on the other, to design them to be elastic in such a manner that during axial tensioning, the desired deformation required for achieving a substantially full surface load-bearing contact between the teeth facing one another is achieved. In fact, with the known prior art, practically, only so-called "outer load supports" can be achieved, that is, pairs of spur gears that bear load only in a radially outer section.

According to the invention, an approach contrary to that of the known prior art is taken and the spur gearing sections are designed such that, viewed in the radial direction, the first and second teeth initially come into contact with one another on the radially inward side during axial clamping of the arrangement, and as clamping increases, also come into contact with one another on the radially outward side. As a surprise among experts and therefore in an inventive manner, it was found in the present case that a load-bearing contact between the opposing tooth surfaces of the teeth on the outer joint part of the constant-velocity joint on the one hand, and on the sleeve section of the wheel hub on the other, can be achieved over a large portion of the surface. This occurs, in particular, both in a radially outward region of these tooth surfaces and in a radially inward region of the tooth surfaces if the tooth surfaces facing one another initially come into contact with one another in the radially inward region during axial tensioning and only in the course of further tensioning, i.e., with increasing clamping force, come also into contact with one another in the radially outward region as a result of elastic deformation.

To ensure that when preparing the gear pair from the sleeve section of the wheel hub and from the outer joint part of the constant-velocity rotary joint, the spur gearing sections, in the course of engaging in one another and during the subsequent tensioning, come initially into contact with one another in a region lying radially further inward, and as tensioning increases, also come into contact with one another in regions lying radially further outward, it is possible—as already described in DE 31 16 720 C1—that at least one of the end faces of the gear pair, i.e., the end face of said outer joint part provided with the spur gearing section and/or the end face of said sleeve section provided with the spur gearing section can be slightly curved. In the present invention, this curvature is convex, whereas in the prior art, it is concave, i.e., plate-shaped. It is sufficient here if only one of the spur gear sections forming the gear pair or the associated component end face thereof or the substructure thereof having the teeth (e.g. the substructure of the outer joint part) is formed slightly convex while the end face or the substructure of the other component having the teeth (thus the one of the wheel hub, in the mentioned example) is flat, i.e., planar.

In order to achieve the elastic deformation described so far in the course of the further tensioning of the gear pair in such a manner (as desired) that starting with the teeth initially engaging on one another only in region further on the radially inward side, these teeth also come into load-bearing contact with one another in regions lying radially further outward, a substructure of the sleeve section and/or of the outer joint pair having the teeth is designed to be more easily deformable in a region lying radially further inward than in a region radially further outward. Advantageously, that region of the gear pair in which the larger proportion of the torque to be transmitted via said gear pair from the drive shaft to the wheel hub is transmitted between the teeth and which, because of the longer lever arm, is the radially outer region of the spur gearing section, can be designed to be particularly stiff and solid. This is not possible in the mentioned prior art (DE 31 16 720 A1 and DE 10 2005 054 283 B4) since in the case of this prior art the radially outer region has to deform elastically in order to achieve a so-called "full load support" and not only an "outer load support" that is mentioned in the present description of the prior art.

There are principally different possibilities as to how a substructure of the wheel hub or the sleeve section thereof and/or of the outer joint part having the teeth can be formed to be more easily deformable in a region lying radially further inward than in a region lying radially further outward. Thus, easier deformability of the substructure having the teeth in the region lying radially further inward can be implemented through a suitable shape and thus through a lower stiffness of this region or through a lower strength, in particular hardness of the substructure having the teeth in the region lying radially further inward, in each case viewed with respect to the stiffness or strength in a region lying radially further outward.

In a wheel hub rotary joint assembly according to the invention, the stiffness and/or strength of the substructure(s) carrying the teeth can be designed such that, viewed in the radial direction over the length of the teeth, a load-bearing contact area of at least 70% is obtained, i.e., in the completely assembled state and the state completely clamped against one another according to the assembly specification. The tooth surfaces facing one another are in load-bearing contact with one another, viewed in the radial direction, over at least 70% of the length.

According to an exemplary embodiment for a wheel hub rotary joint according to the invention that is also described in one of the attached figures, the different strength can be obtained by soft annealing the region lying radially further inward subsequent to the non-cutting shaping of the thus strain-hardened spur gearing section, i.e., after preparing the spur gearing section, for example, in the outer joint part by means of cold forming, e.g., by wobbling or pressing, a radially inner section of the substructure having the teeth can be soft-annealed. As an alternative it is then possible, when the substructure of the outer joint part and/or of the wheel hub having the teeth has a certain softness and therefore as a whole can be slightly deformed by tensioning, to harden that region of this substructure that lies radially further outward so that according to the invention, this region lying radially further outward is less easily deformable than that region of said substructure that lies radially further inward.

According to another exemplary embodiment for a wheel hub rotary joint according to the invention that is also described in one of the attached figures, the substructure having the teeth can have an indentation in the region lying radially further inward. Such an indentation or such an undercut, e.g., in the form of a machined relief groove or a recess shaped together with the spur gearing section results in the fact that in the undercut subregion lying radially further inward, the substructure having the teeth can slightly bend away from the gearing partner, i.e., from the other component, during tensioning of the gear pair. As a result of this, the teeth of the spur gearing sections also come into contact with one another in a load-bearing manner in the region lying radially further outward. Moreover, such a design having an indentation can also be implemented in that a substructure having the teeth is a component which initially is produced independently of the respective component, i.e., of the outer joint part or the wheel hub, and which is subsequently connected to this component in such a manner (for example, in a firmly bonding manner) that a suitable indentation is obtained at the same time. It should generally also be noted that the different embodiments described here can be readily implemented in combination with one another.

According to another exemplary embodiment, the different stiffness in the radial direction of the substructure having the teeth can be implemented in that the teeth arranged distributed over the circumference of at least one of the spur gearing sections interacting with one another do not all extend equally far towards the axis of rotation (of the outer joint part or the wheel hub). The result of this is that when assembling the gear pair, initially not all teeth, but only a portion of all of the teeth provided come into load-bearing contact. Thus, when clamping the wheel hub against the outer joint part, the clamping force introduced by the clamping devices during clamping is distributed at the beginning over fewer teeth than at the end of the clamping process. Thus, at the beginning, a higher force acts proportionally on each of the teeth that contacts a counter tooth in a region lying radially further inward, which higher force facilitates the desired initial deformation of the region located radially further inward. In general, this embodiment can also be described such that the teeth of the spur gearing section which are arranged distributed over the circumference are designed such that when joining the gear pair together, only a partial amount of the first teeth of the first spur gearing section come into contact with the associated teeth of the second spur gearing section at the beginning of the tensioning. This can also be achieved, for example, in that the teeth that extend equally far towards the axis of rotation are formed to have a different width in the region lying further inward so that when joining the mating gears together without tensioning, only some and not all of the teeth associated with one another come into contact with one another.

Another advantageous refinement is based on the aforementioned DE 10 2005 054 285 B4 and/or represents an inventive modification thereof which is adapted in a particularly suitable manner to a wheel hub rotary joint arrangement according to the invention. In fact, it became surprisingly apparent that with a wheel hub rotary joint arrangement according to the invention, probably due to the force or torque transmission between the teeth of the spur gearing section that is more uniform and/or more extensive with respect to DE 10 2005 054 283 B4, a sufficient torsional stiffness and bending stiffness with the required installation space advantageously being reduced at the same time is possible if the ratio between the axial length of the wheel bearing and the mean diameter of the spur gearing section, which is described in detail in DE 10 2005 054 285 B4, is equal or greater than 0.63. Here too, as also described above with regard to DE 10 2005 054 283 B4, the same terms are used again for the same components and dimensions as in DE 10 2005 054 285 B4, which is now relevant. Apart from that, in both of these two documents, namely DE 10 2005 054 283 B4 and DE 10 2005 054 285 B4, which are owned by the same applicant and have the same filing date, the same components are likewise designated with the same terms. It can therefore be assumed that the feature of said diameter ratio, which is to be less than 0.63 in DE 10 2005 054 285 B4, can only be valid for a wheel hub rotary joint arrangement according to DE 10 2005 054 283 B4. In contrast, for a wheel hub rotary joint arrangement described in the present invention, a different diameter ratio, namely equal to or greater than 0.63, is also advantageous since therewith sufficient stiffness can be achieved and, moreover, a particularly compact arrangement can be created that requires relatively little installation space.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
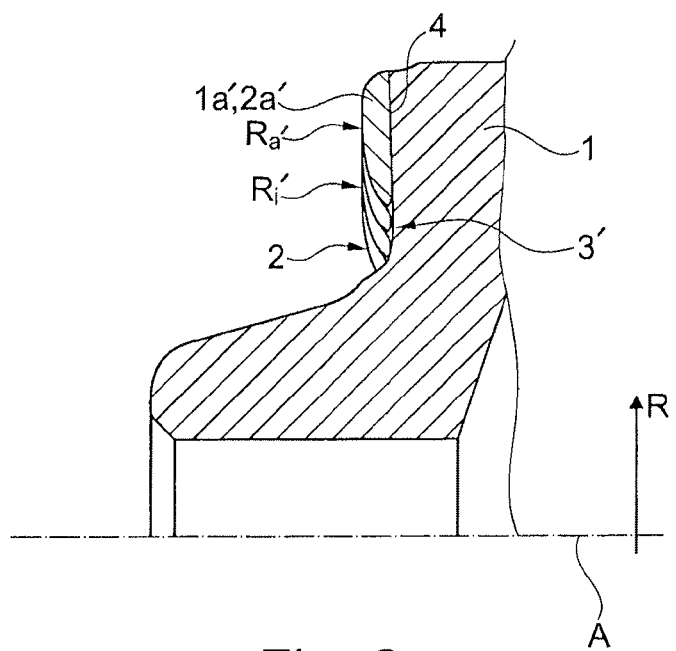
FIG. 2 is a partial cross-section of an outer joint part of a wheel hub rotary joint assembly according to another embodiment of the invention.
Figure 3:
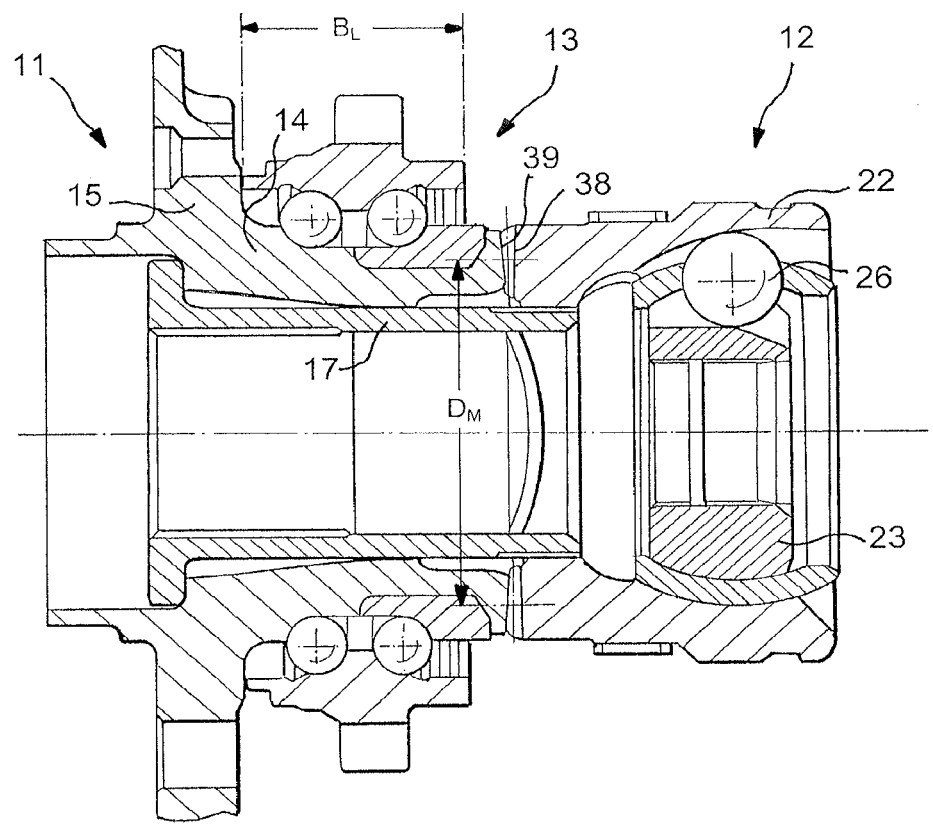
FIG. 3 is a simplified version of FIG. 1 from U.S. Pat. No. 8,025,578 B2, which was incorporated by reference herein.

In the following, FIGS. 1, 2 each show a partial cross-section of an outer joint part 1 designed according to embodiments of the invention of a wheel hub rotary joint arrangement with the axis of rotation A. Elements or components not illustrated in these Figures are known from DE 10 2005 054 283 B4 as shown in FIG. 3 and discussed above.

The reference numbers 2a, 2a' designate a "cut" tooth, shown in a cross-sectional view, of a spur gearing section 2. The tooth 2a is located on a so-called substructure 1a of the outer joint part 1. In the circumferential direction with regard to the axis of rotation A, before and, as can be seen, behind this "cut" tooth 2a, there are further teeth which, as a whole, form the spur gearing section 2 (as shown in the prior art) located on the substructure 1a. Each tooth 2a of this spur gearing section 2 is spaced apart from the axis of rotation A by a certain distance and extends substantially in the radial direction R starting from a region lying further inward in immediate vicinity of the radius $R_i$ and extends outwards up into a region lying radially further outward in the immediate vicinity of the radius $R_a$.

Figure 1:
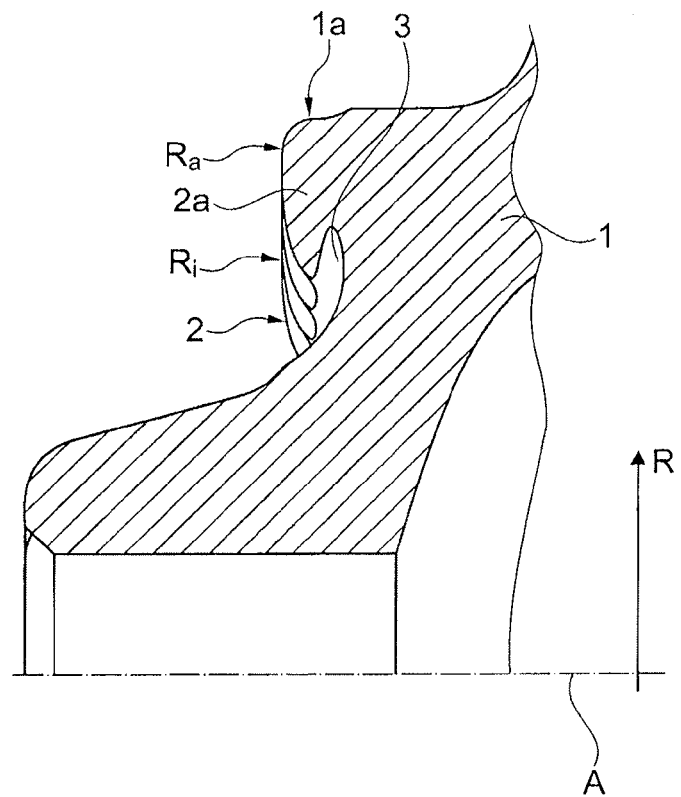
FIG. 1 is a partial cross-section of an outer joint part of a wheel hub rotary joint assembly according to an embodiment of the invention.

In the exemplary embodiment according to FIG. 1, the substructure 1a having the teeth has an undercut 3 in the region (R) lying radially further inward. This undercut was produced either in a non-cutting manner and, advantageously, together with the shaping of the spur gearing section 2, or by cutting at a later time. In the exemplary embodiment according to FIG. 2, the substructure 1a' having the teeth 2a' is a separate component which is initially independent of the outer joint part 1 and which is connected to the outer joint part 1 via a welded joint 4. It is shaped in such a manner that in the assembled state and relative to the outer joint part 1, the substructure 1a' has an undercut 3' in the region ($R_i'$) lying radially further inward. In both figuratively illustrated exemplary embodiments, this undercut 3, 3' effects that the substructure 1a, 1a' of the outer joint part 1 having the teeth 2a, 2a' or the spur gearing section 2 is designed to be more easily deformable by said tensioning via a clamping device in a region ($R_i$, $R_i'$) lying radially further inward than in a region ($R_a$, $R_a'$) lying radially further outward.

Another advantage of a wheel hub rotary joint assembly according to the invention results from the fact that in the case of such spur gear pairs, the individual teeth in a region lying radially further inward can be designed to be not only narrower in the tooth tip region but also more exact, i.e., more precisely fitting, than in a region lying radially further outward, where wider tolerances are to be provided and where the tooth tip area, viewed in the circumferential direction, is slightly wider. Since, according to the invention, the first and second teeth first initially come into contact with one another on the radially inner side when joining the constant-velocity rotary joint together with the wheel hub, the risk that during the movement of these two components towards one another in the direction of the axis of rotation, the first teeth with their tips engage exactly on the tip of the second teeth (and not in a tooth space region of the second teeth) is lower than in the prior art. If in the prior art, the constant-velocity rotary joint and the wheel hub are in such an unfavorable position relative to one another prior to being joined together, automatic tensioning cannot be carried out because in this case only the respective tooth tips of the two spur gearing sections would be tensioned against one another. For the design of a wheel hub rotary joint assembly according to the invention, this risk is lower since the tooth tips in the radially inner region can be designed to be slightly narrower and, in particular, in a more precisely fitting manner so that when joining the two spur gearing sections together, a wheel hub rotary joint assembly according to the invention, as it were, centers itself.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel hub rotary joint assembly with an axis of rotation, the wheel hub rotary joint assembly comprising:
   (a) a wheel hub with a wheel flange for connecting a wheel, and with a sleeve section for receiving a wheel bearing;
   (b) a constant-velocity rotary joint with an outer joint part, an inner joint part and torque-transmitting elements, wherein
      the outer joint part has an end face provided with a first spur gearing section with first teeth at an end facing the wheel hub, and the sleeve section has an end face provided with a second spur gearing section with second teeth at an end facing the constant-velocity rotary joint, wherein the first and second spur gearing sections form a gear pair engaging one another for torque transmission;

(c) a clamp that axially clamps the wheel hub against the outer joint part, said clamp being axially supported on one side on the wheel hub and on another side on the outer joint part, wherein at least one of the first and second spur gearing sections is configured such that, viewed in a radial direction, the first and second teeth initially only come in contact with one another on a small subsurface of the tooth surfaces facing one another during axial clamping of the assembly, which subsurface increases in size during further clamping, and either both end faces of the gear pair formed by the first and second spur gearing sections are curved in a convex manner or only one end face is curved in a convex manner and the other end face is flat, wherein the first and second spur gear sections are each configured such that, viewed in the radial direction, the first and second teeth initially come into load-bearing contact with one another on a radially inward side and, as tension increases, also come into load-bearing contact with one another on a radially outward side, wherein a substructure of the sleeve section and/or of the outer joint part having the teeth is configured to be more easily deformable in a region lying radially further inward than in a region lying radially further outward.

2. The wheel hub rotary joint assembly according to claim 1, wherein:

the substructure having the teeth in the radially inner region is shaped to provide the easy deformability via a lower stiffness of the region with respect to the radially outer region.

3. The wheel hub rotary joint assembly according to claim 2, wherein a stiffness and/or strength of the substructure having the teeth is designed such that, viewed in the radial direction over the length of the teeth, a load-bearing contact area of at least 70% is obtained.

4. The wheel hub rotary joint assembly according to claim 2, wherein the teeth of the first spur gearing section arranged distributed over a circumference are configured such that when joining the first and second spur gearing sections together at the time of the clamping, only a partial amount of the first teeth of the first spur gearing section comes into contact with associated teeth of the second spur gearing section in order to achieve a different stiffness in the radial direction of the substructure having the teeth.

5. The wheel hub rotary joint assembly according to claim 1, wherein the substructure having the teeth in the radially inner region is formed to have a lower hardness with respect to the hardness of the radially outer region.

6. The wheel hub rotary joint assembly according to claim 5, wherein a stiffness and/or strength of the substructure having the teeth is designed such that, viewed in the radial direction over the length of the teeth, a load-bearing contact area of at least 70% is obtained.

7. The wheel hub rotary joint assembly according to claim 1, wherein a stiffness and/or strength of the substructure having the teeth is designed such that, viewed in the radial direction over the length of the teeth, a load-bearing contact area of at least 70% is obtained.

8. The wheel hub rotary joint assembly according to claim 1, wherein a different strength is achieved in the radially inner region via soft annealing of the region subsequent to a non-cutting shaping of the first spur gearing section.

9. The wheel hub rotary joint assembly according to claim 1, wherein the substructure having the teeth includes an undercut in the radially inner region.

10. The wheel hub rotary joint assembly according to claim 1, further comprising:

a double-row wheel bearing for rotatably mounting the wheel hub with a bearing inner ring formed separately from the wheel hub and axially clamped by a flange on the sleeve section, wherein the constant-velocity rotary joint, in addition to the outer joint part, has an inner joint part and torque-transmitting balls, and a ratio between an axial length of the wheel bearing and a mean diameter of the spur gearing section is equal to or greater than 0.63.

* * * * *